(12) United States Patent
Meiyappan

(10) Patent No.: US 6,519,670 B1
(45) Date of Patent: Feb. 11, 2003

(54) METHOD AND SYSTEM FOR OPTIMIZING A HOST BUS THAT DIRECTLY INTERFACES TO A 16-BIT PCMCIA HOST BUS ADAPTER

(75) Inventor: Subramanian S. Meiyappan, Tempe, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/498,399

(22) Filed: Feb. 4, 2000

(51) Int. Cl.$^7$ .......................... G06F 13/00; G06F 13/40
(52) U.S. Cl. .................. 710/305; 710/110; 710/240; 712/32
(58) Field of Search ..................... 710/305, 300–302, 710/62, 107, 63, 110, 240; 712/31–33; 709/208; 711/100

(56) References Cited

U.S. PATENT DOCUMENTS 5,649,128 A * 7/1997 Hartley
5,774,684 A * 6/1998 Haines et al.
6,049,844 A * 4/2000 Matsui et al.

* cited by examiner

Primary Examiner—Gopal C. Ray
(74) Attorney, Agent, or Firm—Peter Zawilski

(57) ABSTRACT

In an example embodiment, a data transaction access system for an embedded microprocessor coupled to a PCMCIA bus device comprises a local bus adapted to convey digital signals. Coupled to the local bus is a bus master. A host bus adapter couples to the local bus for enabling communication between the bus master and a PCMCIA device coupled to the host bus adapter via a PCMCIA bus. A wait register is coupled to the host bus adapter. The wait register is adapted to receive a delay input describing a latency period of the PCMCIA device, wherein the host bus adapter is configured to insert wait states into a data transaction from the bus master to the PCMCIA device when the delay input is less than a predetermined amount and wherein the host bus adapter is configured to retry the bus master when the delay input is greater than the predetermined amount.

20 Claims, 8 Drawing Sheets

US 6,519,670 B1

METHOD AND SYSTEM FOR OPTIMIZING A HOST BUS THAT DIRECTLY INTERFACES TO A 16-BIT PCMCIA HOST BUS ADAPTER

TECHNICAL FIELD

The present invention pertains to the field of computer system bus architectures. More particularly, the present invention relates to a method and system for optimizing host buses that directly interface to 16-bit PCMCIA host bus adapters.

BACKGROUND ART

A bus architecture of a computer system conveys much of the information and signals involved in the computer system's operation. In a typical computer system, one or more busses are used to connect a central processing unit (CPU) to a memory and to input/output elements so that data and control signals can be readily transmitted between these different components. When the computer system executes its program, it is imperative that data and information flow as fast as possible in order to make the computer as responsive as possible to the user. With many peripheral devices, such as graphics adapters, full motion video adapters, small computer systems interface (SCSI) host bus adapters, and the like, it is imperative that large block data transfers be accomplished expeditiously. These applications are just some examples of subsystems that benefit substantially from a fast efficient bus transfer rate.

Much of a computer system's functionality and usefulness to a user is derived from the functionality of the peripheral devices. For example, the speed and responsiveness of the graphics adapter is a major factor in a computer system's usefulness as an entertainment device. Or, for example, the speed with which video files can be retrieved from a hard drive and played by the graphics adapter determines the computer system's usefulness as a training aid. Hence, the rate at which data can be transferred among the various peripheral devices often determines whether the computer system is suited for a particular purpose. The electronics industry has, over time, developed several types of bus architectures. Recently, the PCMCIA bus architecture has become one of the most widely used, widely supported bus architectures in the industry, particularly with respect to mobile computer devices such as "laptop" computers. The PCMCIA bus was developed to provide a moderate speed, low latency bus architecture from which a large variety of removable devices could be developed.

Referring now to prior art FIG. 1, a typical PCMCIA bus system 100 in accordance with the prior art is shown. As depicted in FIG. 1, system 100 includes a PCMCIA bus 115 coupled to a 16-bit host bus adapter 104 and a PCMCIA device 120. PCMCIA device 120 is coupled to PCMCIA bus 115 via a socket 116. PCMCIA device 120 is a typical removable device, such as, for example, a removable modem, hard disk drive, ethernet adapter, or the like. In a typical implementation, system 100 includes two or more sockets 116 configured to accept removable PCMCIA devices. Host bus adapter 104 is coupled to a Southbridge 103 which is in turn coupled to a Northbridge 102. The Northbridge 102 is coupled to the host x86 processor 101 via the processor local bus 110.

The PCMCIA specification encompasses two bus standards. The standards are referred to as the PC Card 16 standard and the Cardbus standard. The PC Card 16 standard is a 16-bit "ISA like" interface (industry standard architecture) and is the most widely implemented. The Cardbus standard is more recent and closely follows the PCI (peripheral component interconnect) protocol. System 100 of FIG. 1 is a PC card 16 compatible system.

Referring still to FIG. 1, with PC card 16 compliant systems (e.g., system 100), the host processor 101 communicates with PCMCIA device 120 through the host bus adapter 104. The host bus adapter supports the PCMCIA standard protocols and functions as a bridge between the typical x86 architecture of system 100 and the PCMCIA compliant devices. PCMCIA HBAs (host bus adapters) are typically found in laptop computers where power, portability, and throughput are of main concerns. System 100 of FIG. 1 is one such system. Components 101–115 are located within the laptop computer, while the external PCMCIA device 120 is coupled to the laptop computer via the connector 116. Within the laptop computer, the north bridge 102 usually contains high-speed, high-performance devices and the south bridge 103 acts as an interface to slower peripheral devices.

It should be noted that in the architecture of system 100, the speed at which the PCMCIA devices (e.g., PCMCIA device 120) operate and hence the activities on the HBA 104 does not impact the performance on the processor local bus 110. 16-bit PC Card devices such as PCMCIA device 120 are typically slow devices, and hence, the associated "PC-16 card" interface is typically a slow interface. Due to legacy reasons (e.g., compatibility with legacy systems), the PCMCIA cards run at ISA frequencies ranging from 4.77 MHz to 8 MHz. Based on the speed of the coupled external device (e.g., PCMCIA device 120), the HBA 104 holds the host bus (e.g., the bus between HBA 104 and Southbridge 103) or retries the host (or any other bus master) until the transaction can be completed on the PCMCIA bus 115.

With advancements in semiconductor technology, the use of embedded microprocessors inside ASICs (application-specific integrated circuits) is very common. In order to have access to the large number of PCMCIA devices on the market, it is imperative that these embedded microprocessor based ASICs support PCMCIA HBAs so that any PCMCIA device can be "plugged in" and used.

There is a problem, however, in that embedded microprocessor based systems do not typically support multiple levels of bus hierarchy. In order to minimize access latency, the bridges required to implement multiple levels of busses are eliminated. A typical implementation of a PCMCIA host bus adapter in an embedded system is illustrated in prior art FIG. 2.

Prior art FIG. 2 shows a typical embedded PCMCIA bus system 200 in accordance with the prior art. Prior art system 200 includes a host processor 201, a processor local bus 210, and a host bus adapter 204. Components 201, 210, and 204 of system 200 function in a substantially similar manner as their corresponding components 101, 110, and 104 of system 100 of FIG. 1. System 200 is an example of an embedded system implemented as a single ASIC. For example, processor 201 can be an ARM (advanced RISC microprocessor) processor and the local bus 210 can be an ASB bus (Advanced System Bus).

Thus system 200 shows one problem associated with the design of host bus adapters that interface directly to the processor local bus in embedded microprocessor ASICs. For example, in the case where HBA 204 interfaces with device 120 that supports IO transactions and houses an I/O device, HBA 204 can occupy and monopolize the processor local bus 210 while waiting for the I/O transactions with device 120 to complete. For example, assuming that the access latency of the device 120 is such that it inserts wait states on accesses from the PCMCIA HBA 204, and assuming the processor local bus 210 operates at 100 MHz while the HBA 204 runs at 8 MHz, when the host processor 201 reads or writes to an IO device 120, the device interface asserts the WAIT# signal for 250 ns. This extends the host bus adaptor's cycle to one more cycle until WAIT# is deasserted. If the host bus is held off by the HBA 204 until this transaction is complete, the entire transaction takes at least 500 ns, which translates to the processor local bus 210 not being available for other devices/masters for 50 clock cycles. This has a very significant adverse impact on performance and the throughput on the local bus 210. It should be noted that WAIT# signals can be asserted for a maximum of 12 us. Thus, if the HBA 204 reflects the transaction on the PCMCIA bus 115, then the processor local bus 210 is unavailable to other resources for an excessively long time.

Referring still to prior art FIG. 2, typical solutions to this problem would include a retry mechanism by which the HBA 204 retries the processor local bus 210 until the transaction can be completed. However, simply retrying the processor local bus 210 on every access until the device 120 is ready does not improve the situation significantly. For example, every time a master on bus 210 comes back to access device 120 through HBA 204, the processor local bus 210 is still being used by the master and the HBA 204 as HBA 204 has to respond with retry cycles. Further, retry mechanisms typically include arbitration latency and additional switching activity on the processor local bus 204, thereby causing unnecessary power utilization. Additionally, in some prior art implementations, HBA 204 is configured to start a data transaction, sample the WAIT# signal to see if device 120 is ready, and then asserts a response on processor local bus 210.

Thus, what is required is method and system which minimizes the local bus monopolization problems that occur where a faster device on the processor local bus of embedded microprocessor ASIC continually attempts to access a slower PC card device on a PCMCIA bus. The required system should minimize local bus monopolization problems without adding additional switching activity or latency to the operation of the local bus. The required system should significantly increase the available local bus data transfer bandwidth available to embedded microprocessor applications. The present invention provides a novel solution to the above requirements.

DISCLOSURE OF THE INVENTION

The present invention provides a method and system that minimizes the local bus monopolization problems that occur where a faster device on the processor local bus of embedded microprocessor ASIC continually attempts to access a slower PC card device on a PCMCIA bus. The system of the present invention minimizes local bus monopolization problems without adding additional switching activity or latency to the operation of the local bus. In addition, the system of the present invention significantly increases the available local bus data transfer bandwidth available to the embedded microprocessor.

In one embodiment, the present invention is implemented as a data transaction access system for an embedded microprocessor coupled to a PCMCIA bus device. In this embodiment, the data transaction access system is integrated with the embedded microprocessor as a single ASIC. The system includes a processor local bus, at least one bus master (e.g., the microprocessor) coupled to the local bus, and a host bus adapter coupled to the local bus for enabling communication between the bus master and a PCMCIA device. The PCMCIA device is coupled to the host bus adapter via a PCMCIA bus. The bus master uses the local bus to communicate with the PCMCIA device via the host bus adapter. A wait register is coupled to host bus adapter to receive a delay input from the PCMCIA device describing a latency period of the device when completing a data transaction. Where the latency period described by the delay input is less than a predetermined amount, the host bus adapter is configured to insert wait states into the data transaction of the bus master. Where the latency period is greater than the predetermined amount, the host bus adapter is configured to retry the data transaction of the bus master.

In a second embodiment, the wait register is adapted to couple the delay input to the bus master such that the bus master initiates a subsequent access to the PCMCIA device at the expiration of the latency period. After the initial access is retried, the bus master reads the delay input stored in the wait register and attempts the subsequent access in accordance with the delay specified. In so doing, the data transaction is completed without numerous wasted retries being imposed on the processor local bus.

In a third embodiment, the embedded system includes an arbiter for controlling access to the processor local bus. The arbiter is coupled to read the delay input stored in the wait register. The arbiter ensures efficient utilization of the processor local bus by not granting the local bus to the requesting bus master for a subsequent access until the expiration of the latency period. Once the latency period expires, the arbiter grants to local bus to the bus master and the bus master completes the data transaction.

BRIEF DESCRIPTION OF THE DRAWINGS

The accompanying drawings, which are incorporated in and form a part of this specification, illustrate embodiments of the invention and, together with the description, serve to explain the principles of the invention.

Prior art

Prior art

BEST MODE FOR CARRYING OUT THE INVENTION

Reference will now be made in detail to the preferred embodiments of the invention, a method and system for optimizing a host bus that directly interfaces to a 16 bit PCMCIA host bus adapter, examples of which ate illustrated in the accompanying drawings. While the invention will be described in conjunction with the preferred embodiments, it will be understood that they are not intended to limit the invention to the these embodiments. On the contrary, the invention is intended to cover alternatives, modifications, and equivalents, which may be included within the spirit and scope of the invention as defined by the appended claims. Furthermore, and the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The present invention is a method and system for optimizing a host bus that interfaces directly to a 16 bit PCMCIA host bus adapter. The system of the present invention provides a method and system that minimizes the local bus monopolization problems that occur where a faster device on the processor local bus of embedded microprocessor ASIC continually attempts to access a slower PC card device on a PCMCIA bus. The system of the present invention minimizes local bus monopolization problems without adding additional switching activity or latency to the operation of the local bus. In addition, the system of the present invention significantly increases the available local bus data transfer bandwidth available to the embedded microprocessor. The present invention and its benefits are further described below.

Figure 1:
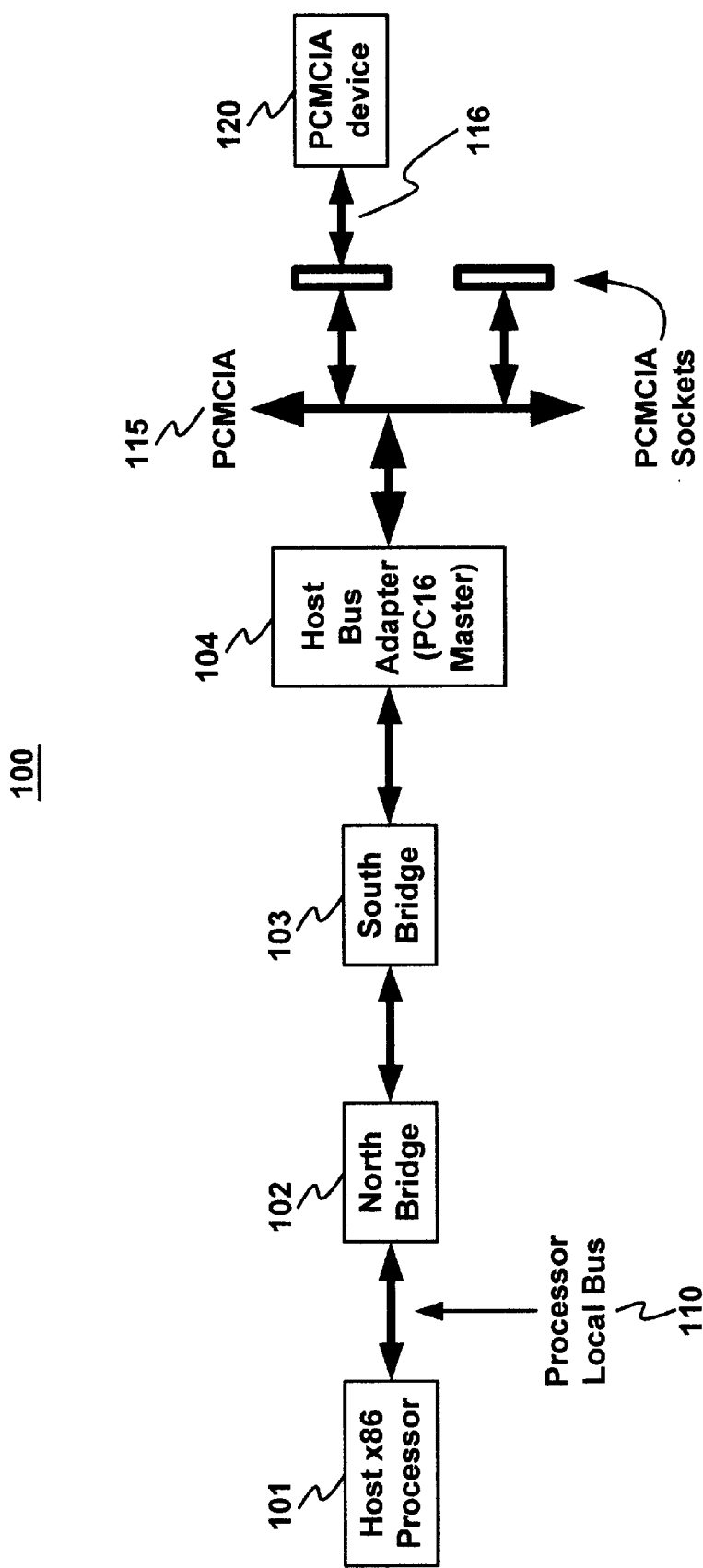
FIG. 1 shows a typical prior art PCMCIA bus architecture.
Figure 2:
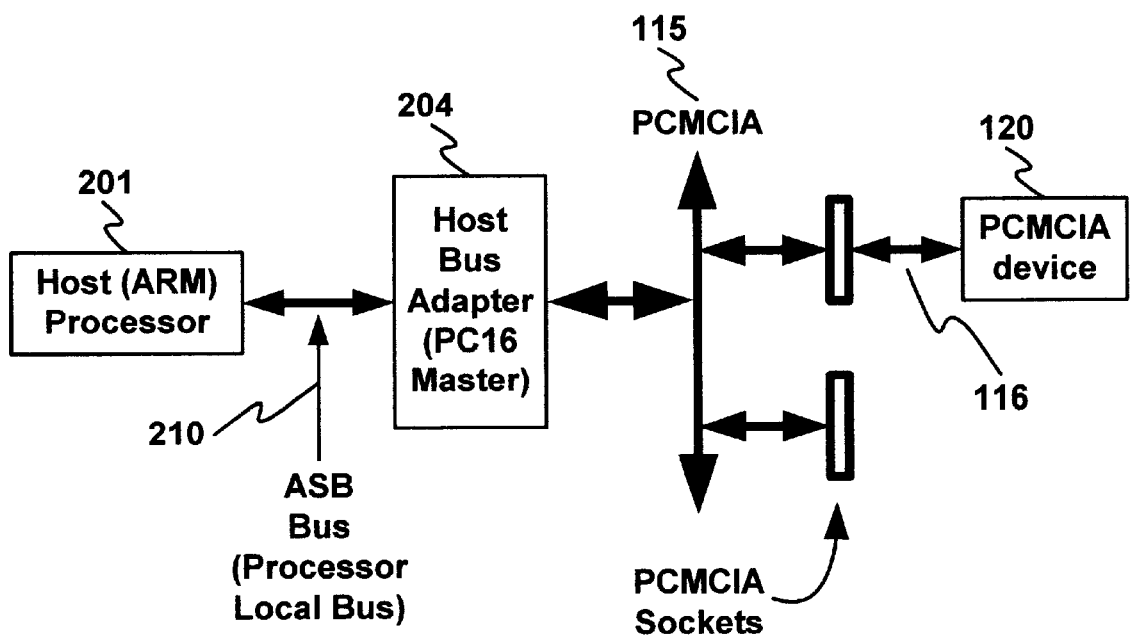
FIG. 2 shows a typical prior art embedded PCMCIA bus system architecture.
Figure 3A:
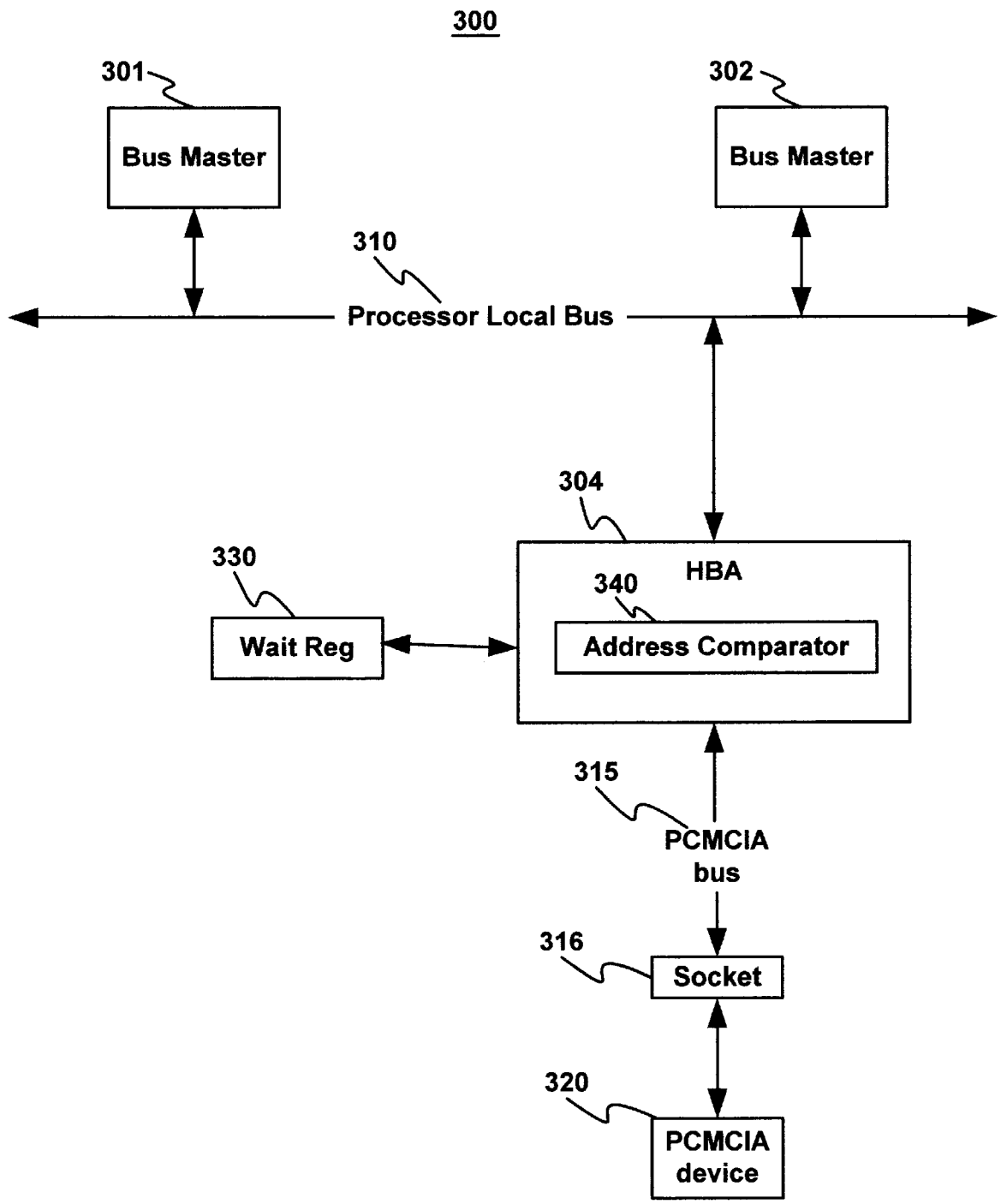
FIG. 3A shows a PCMCIA bus system in accordance with one embodiment of the present invention.

Referring now to FIG. 3A, a PCMCIA bus system 300 in accordance with one embodiment of the present invention is shown. As depicted in FIG. 3A, system 300 includes a PCMCIA bus 315 which couples a PCMCIA device 320 to a host bus adapter (HBA) 304. The HBA 304 is coupled to a processor local bus 310. A first bus master 301 and a second bus master 302 are also coupled to processor local bus 310. HBA 304 includes an internal address comparator 340 and is coupled to a wait register 330. In this embodiment, one of bus masters 301–302 is the host microprocessor of system 300.

As depicted in FIG. 3A, PCMCIA device 320 is a typical removable device, such as, for example, a removable modem, hard disk drive, ethernet adapter, or the like. In a typical implementation, PCMCIA device 320 is a removable PC card device configured to plug into the components of system 300 via a socket 316. In this embodiment, system 300 (except for PCMCIA device 320) is an embedded microprocessor type system, such as, for example, a handheld PDA (personal digital assistant). Bus masters 301–302, processor local bus 310, HBA 304, and wait register 330 are embedded into a single ASIC, thus, providing for a very small form factor (e.g., as required in a PDA), while preserving the expandable functionality provided by the inclusion of socket 316 and the ability to connect to external PC card devices such as PCMCIA device 320.

The PCMCIA device 320 can be automatically configured and activated upon insertion into socket 320 by a user. PCMCIA device 320 is coupled to the host bus adapter via the PCMCIA bus 315 and HBA 304. Once coupled, the bus masters on the processor local bus are able to communicate with the PCMCIA device 320 via the host bus adapter. In this manner, HBA 304 functions as a bridge between the speeds and protocols of processor local bus 310 and those of PCMCIA bus 315.

Referring still to FIG. 3A, in the present embodiment, wait register 330 is coupled to host bus adapter 304 to receive a delay input from the PCMCIA device 320 describing a latency period of the device when completing a data transaction. This latency period is due to the fact that the operating speeds of the processor local bus 310 and PCMCIA bus 315 can be very different. Hence, the speed at which devices coupled to PCMCIA bus 315 communicate (e.g., PCMCIA device 320) is very much different from the speed at which devices coupled to processor local bus 310 communicate (e.g., bus masters 301–302). For example, PCMCIA bus 315 operates at 8 MHz while processor local bus 310 can operate at 66 MHz or greater.

In accordance with the present invention, system 300 minimizes the adverse performance impact incurred due to the speed difference of the two busses 310 and 315. HBA 304 uses information programmed into wait register 330 to minimize performance degradation. In one embodiment, wait register 330 is programmed by the host processor with a delay input by reading the PCMCIA device 320. The delay input describes the latency of device 320. In the present embodiment, the device driver of PCMCIA device 320 is automatically loaded when device 320 is inserted into socket 316. The device driver subsequently loads wait register 330 with the delay input. HBA 304 also stores the I/O address assigned to PCMCIA device 320. Thus, when one of bus masters 301–302 attempts a data transaction with PCMCIA device 320, HBA 304 uses the delay input in wait register 330 and the address of the transaction using the address stored in address comparator 340 to determine which device is being addressed. When the transaction targets PCMCIA device 320 (as determined by the address of the transaction matching the address stored in address comparator 340) HBA 304 decides to either retry the transaction or insert wait states on the processor local bus 304, depending upon the latency of PCMCIA device 320. HBA 304 makes the decision by comparing the delay input stored in wait register 330 with a predetermined amount. This predetermined amount characterizes the degree to which system 300 can tolerate latency on the processor local bus 310.

For example, where PCMCIA device 320 is a memory card having relatively low latency, a low delay input is stored in wait register 330 and thus, HBA 304 inserts an appropriate number of wait states into the transaction as opposed to issuing a retry. Where PCMCIA device 320 is a high latency device (e.g., a telephone modem), a high delay input is stored in wait register 330 and HBA 304 then retries the transaction as opposed to inserting a large number of wait states, thus freeing the processor local bus 310 for other transactions as opposed to monopolizing the bus with a large stream of wait states. Where the processor local bus 310 is much faster than PCMCIA bus 320, a lower predetermined amount is used to compare against the delay input, thus reflecting the lower amount of tolerance the overall system has for latency on processor local bus 310. In this manner, HBA 304 of system 300 actively participates in the transactions directed at PCMCIA device 320 to increase the throughput on the processor local bus 310.

Additionally, HBA 304 of system 300 is configured to "predictively" assert responses on the processor local bus before actually performing the transaction on the PCMCIA bus 315. This aspect saves additional time. The predictive assertion of responses of the present invention also saves power in comparison to prior art methods and decreases response latency.

Figure 3B:
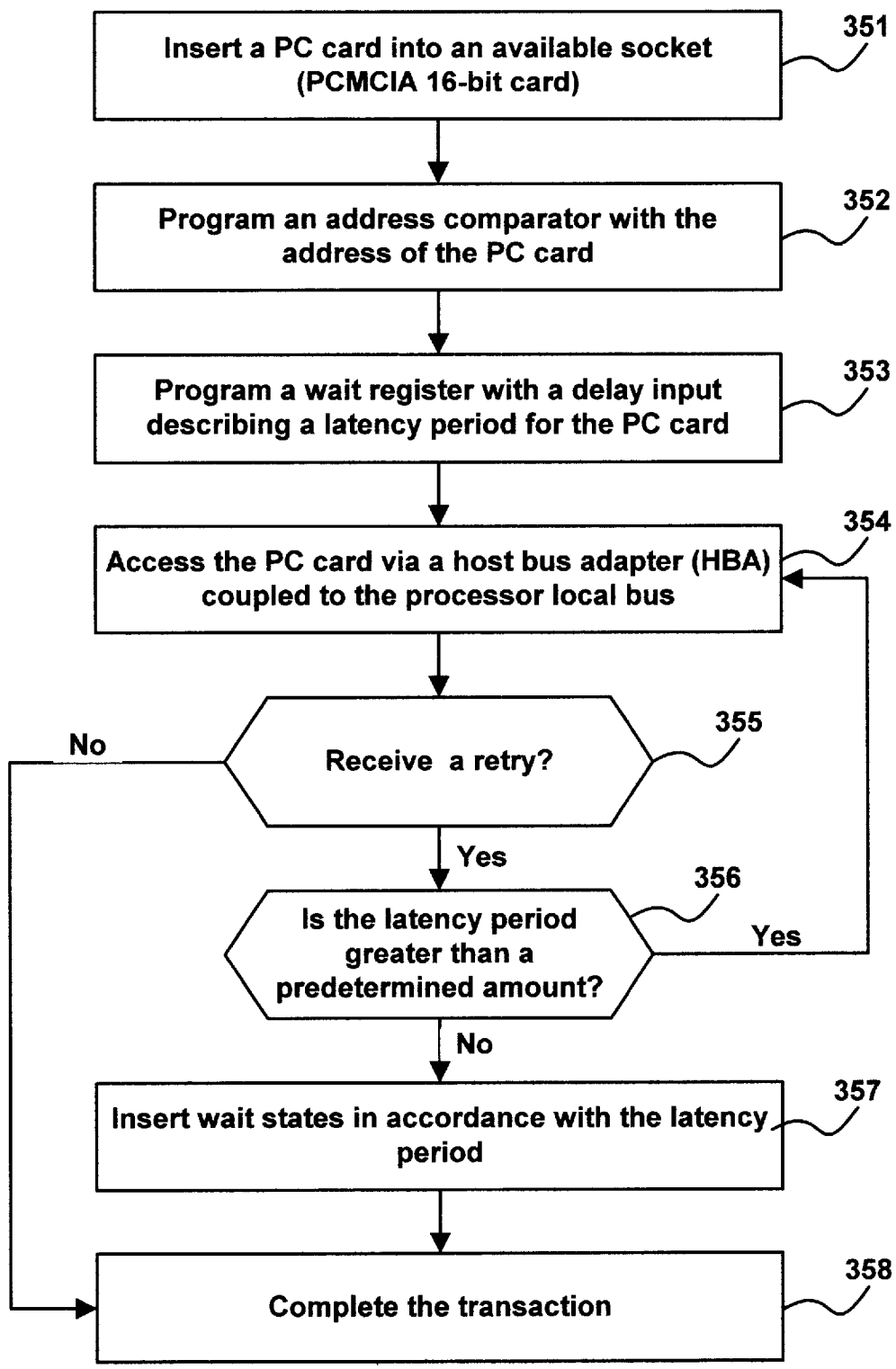
FIG. 3B shows a flow chart of the steps of a process in accordance with one embodiment of the present invention.

FIG. 3B shows a flowchart of a process 350 in accordance with one embodiment of the present invention. Process 350 depicts the operating steps of a communication process as implemented on system 300, wherein the HBA 304 actively participates in the transactions directed at PCMCIA device 320 to minimize the monopolization of processor local bus 310 (e.g., by inserting wait states or issuing retries).

Process 350 begins in step 351, where the PCMCIA device 320 is inserted into socket 316. In this embodiment, PCMCIA device 320 is a "16-bit" PC card device. Upon insertion, the device driver for PCMCIA device 320 is automatically loaded and device 320 is automatically configured for operation.

In step 352, the device driver automatically programs address comparator 340 with the I/O address of the PC card 320 (e.g., PCMCIA device 320).

In step 353, the device driver automatically programs wait register 330 with a delay input describing the latency period for the particular PC card. As described above, depending upon the type of device implemented by PC card 320 (e.g., telephone modem, flash memory, or the like), the PC card will have a certain amount of data transfer latency. The delay input describes this particular latency.

In step 354, the PC card 320 is accessed by one of bus masters 301–302 via the HBA 304. As described above, HBA 304 functions as a bridge between the devices on the processor local bus 310 and the PCMCIA bus 315.

In step 355, depending upon the specific type of device implemented in PC card 320, the HBA 304 will either issue a retry or not. Where the data is immediately available, such as where the data transaction is a write transaction and where the write data can be "posted" in HBA 304 for later forwarding, a retry is not issued and process 350 proceeds directly to step 358 where the transaction is completed. Where the data transaction is such that it cannot be immediately executed (e.g., a read transaction), process 350 proceeds to step 356.

In step 356, HBA 304 uses the address stored in address comparator 340 and the delay input stored in wait register 330 to determine whether the latency period described by the delay input is greater than a predetermined amount. The address comparator 340 is used to recognize transactions directed at PC card 320. The predetermined amount is preset (e.g., during manufacturing or in a programmable "system configuration register") to reflect the amount of latency the overall system can tolerate on the processor local bus 310. If the latency period is greater than the predetermined amount, process 350 proceeds back to step 354 and simply continues to complete the data transaction until the transaction is successfully completed. If the latency period is less than the predetermined amount, process 350 proceeds to step 357.

In step 357, where the latency period is less than the predetermined amount, wait states are inserted into the data transaction in accordance with the latency period. This holds the processor local bus 310 until the completion of the transaction.

In step 358, the wait states expire in accordance with the latency period and the transaction successfully completes.

Figure 4A:
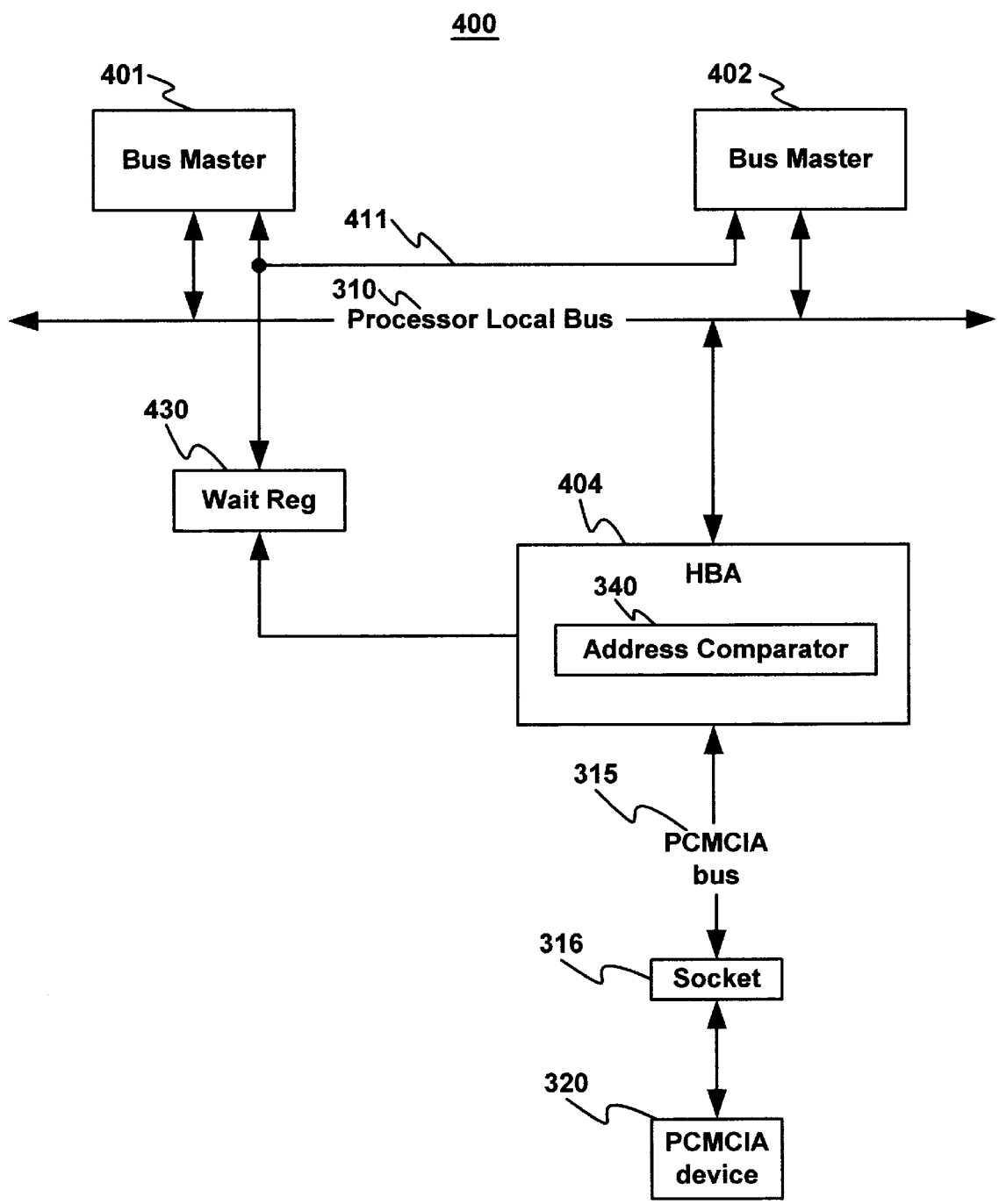
FIG. 4A shows a PCMCIA bus system in accordance with a second embodiment of the present invention.

Referring now to FIG. 4A, a diagram of a PCMCIA bus system 400 in accordance with a second embodiment of the present invention is shown. As depicted in FIG. 4A, system 400 includes a PCMCIA bus 315 which couples a PCMCIA device 320 to a HBA 404. The HBA 404 is coupled to a processor local bus 310. A first bus master 401 and a second bus master 402 are also coupled to processor local bus 310. HBA 404 is coupled to a wait register 430.

As depicted in FIG. 4A, components 310, 340, 315, 316, and 320 of system 400 function as described in the discussion of system 300 of FIG. 3A. In this embodiment, the wait register 430 is adapted to couple the delay input stored therein from PCMCIA device 320 to each of bus masters 401–402 such that the bus masters initiate subsequent accesses to the PCMCIA device 320 at the expiration of the latency period. Bus masters 401–402 receive the delay period via line 411. After the initial access is retried, the bus master attempting the access reads the delay input stored in the wait register 430 and attempts a subsequent access in accordance with the delay specified. In so doing, the data transaction is completed without numerous wasted retries being imposed on the processor local bus and without the imposition of wait states onto processor local bus 310.

It should be noted that wait register 430 of the present embodiment functions as a global register available to each bus master coupled to the processor local bus 310. Additionally, the address information stored by address comparator 340 is used to recognize accesses to PCMCIA device 320. After the time specified by wait register 430 elapses, the bus master device retries the transaction to the HBA 404. This transaction thus has a high probability of completing. In this manner, system 400 of the present embodiment ensures that the transaction is completed with only two data cycles on the processor local bus 310. This frees up processor local bus 310 for other masters to acquire it and use it for more useful purposes.

Figure 4B:
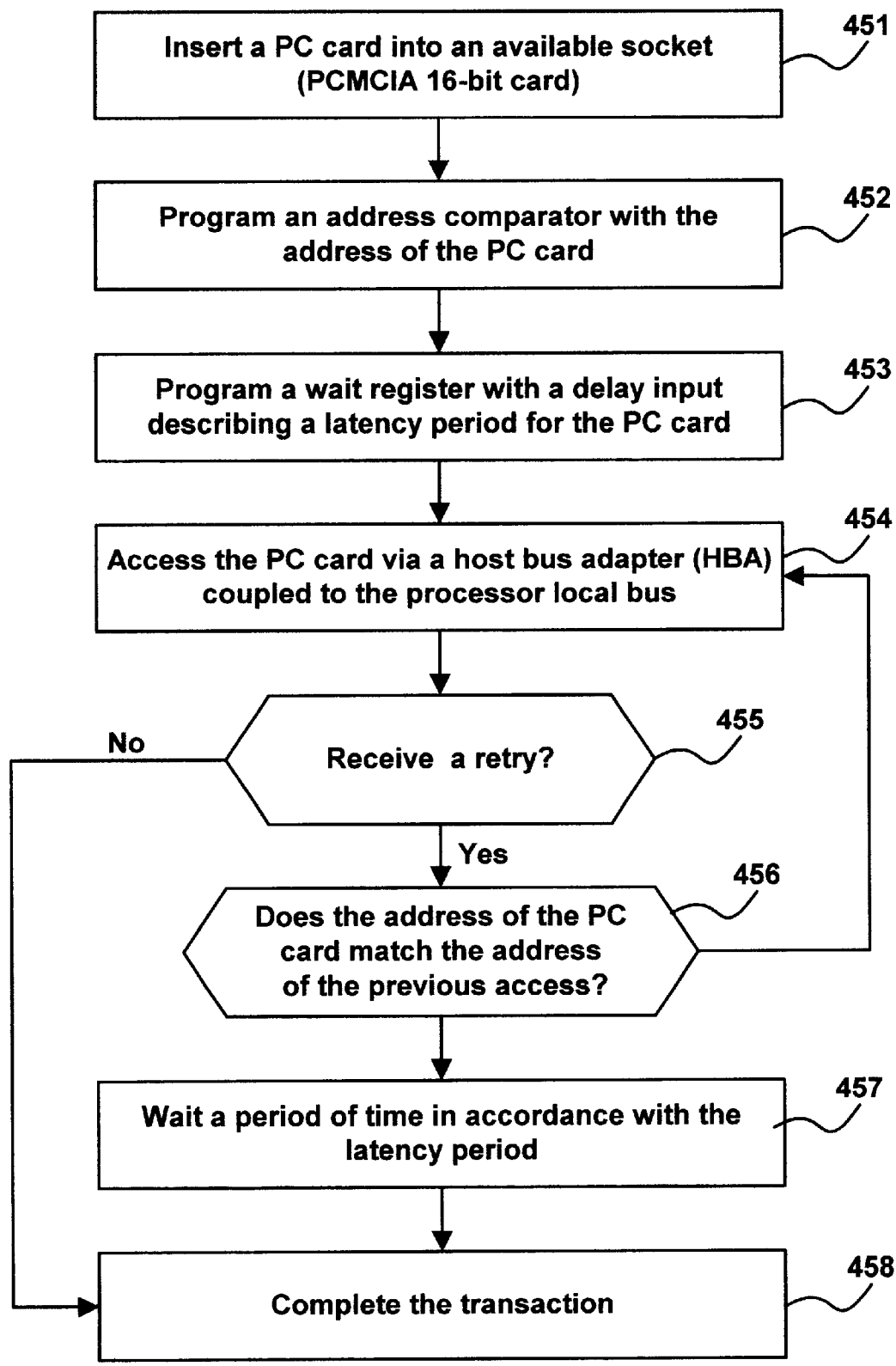
FIG. 4B shows a flow chart of the steps of a process in accordance with a second embodiment of the present invention.

FIG. 4B shows a flowchart of a process 450 in accordance with one embodiment of the present invention. Process 450 depicts the operating steps of a communication process as implemented on system 400, wherein the delay input stored in wait register 430 is made available to each bus master for timing subsequent accesses, thereby minimizing the monopolization of processor local bus 310.

With respect to steps 451–455, it should be noted in the discussion of process 450 below that steps 451–455 function substantially the same way as the corresponding steps 351–355 of process 350 of FIG. 3B, and hence, their description is not repeated.

In step 456, a bus master uses the address stored in address comparator 340 and the delay input stored in wait register 430 to determine whether the address of the PC card 320 matches the address of the previously attempted access. The bus master uses this information to determine whether a subsequent transaction (wherein the previous transaction received a retry in step 455) is directed at the same PC card device 320. Where the address matches, the bus master will read the latency period stored in wait register 430 via line 411 and will wait a period of time in accordance with latency period.

In step 457, the bus master waits a period of time in accordance with the latency period stored in wait register 430. As described above, this period of time corresponds to the amount of latency involved in completing the data transaction with the PC card device 320.

In step 458, after the expiration of the latency period, the bus master re-arbitrates for the bus and has a high probability of successfully completing the transaction. By waiting at amount of time dictated by the latency period, the bus master avoids tying up the processor local bus 310 with wait states or wasted access attempts.

Figure 5A:
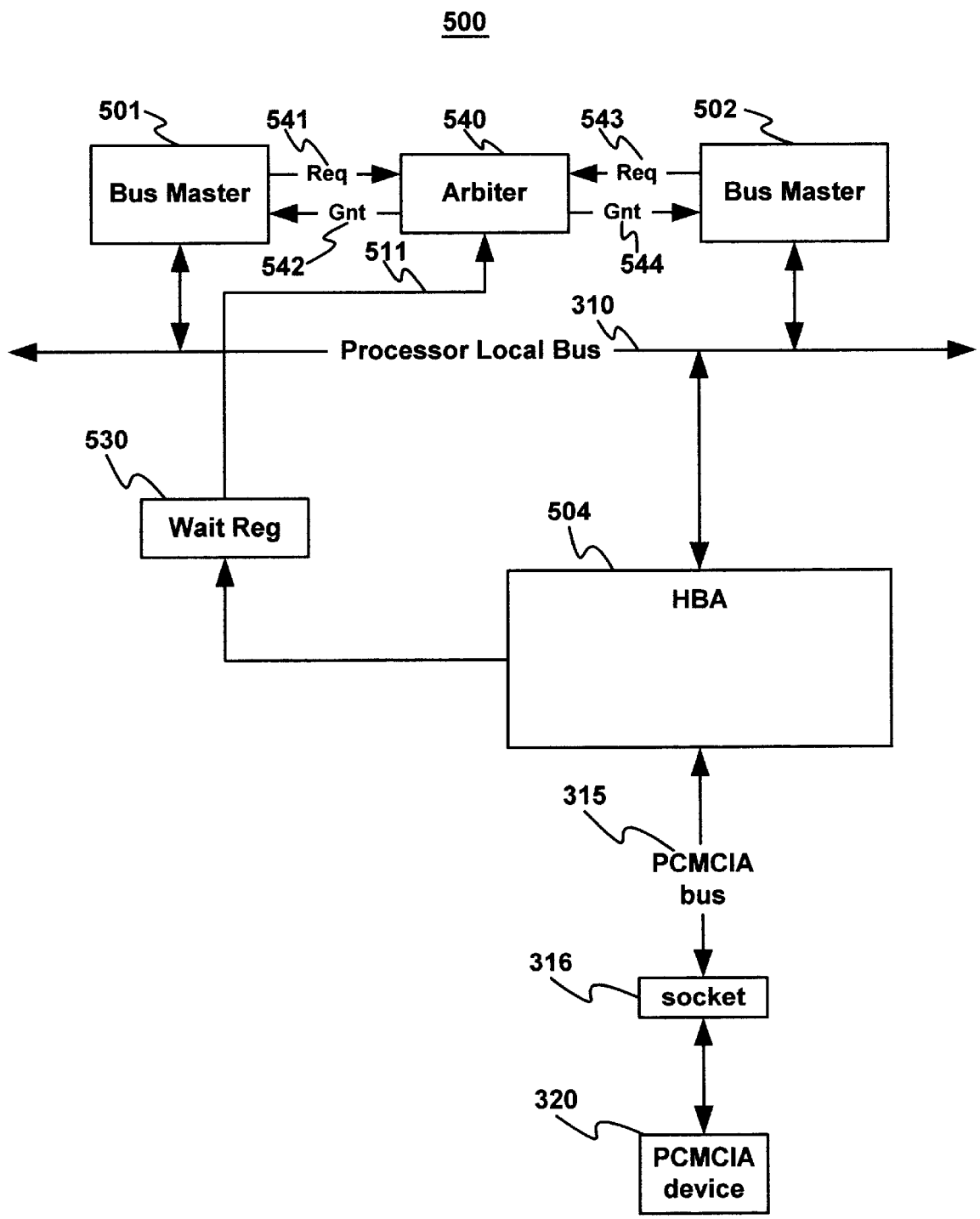
FIG. 5A shows a PCMCIA bus system in accordance with a third embodiment of the present invention.

Referring now to FIG. 5A, a diagram of a PCMCIA bus system 500 accordance with a third embodiment of the present invention is shown. As depicted in FIG. 5A, system 500 includes a PCMCIA bus 315 which couples the PCMCIA device 320 to an HBA 504. The HBA 504 is coupled to the processor local bus 310. A first bus master 501 and a second bus master 502 are also coupled to processor local bus 310. In this embodiment, an arbiter 540 is coupled to bus master 501 and 502 via respective request grant lines 541–542 and 543–544. Arbiter 540 is also coupled to a wait register 530.

As depicted in FIG. 5A, components 310, 315, 316, and 320 of system 500 function as described in the discussion of system 300 of FIG. 3A. In this embodiment, an address comparator 340 is not required. Additionally, in this embodiment, the wait register 530 is adapted to couple the input delay stored therein from PCMCIA device 320 to the arbiter 540 (via line 511) as opposed to each bus master as in system 400 of FIG. 4A. This configuration of wait register 530 allows the arbiter 542 control access to processor local bus 310 in accordance with the availability of data within PCMCIA device 320 for the completion of the data transaction. The latency period is stored within wait register 530 in manner described in the discussion of system 300 and system 400. This latency period is used by arbiter 540 to control when a bus master is granted control of processor local bus 310 to complete a previously attempted data transaction.

In the present embodiment, arbiter 540 uses the "number" of the bus master (e.g., bus master 501, 502, etc.) and the latency period stored within wait register 530 to determine when one of bus masters 501–502 attempts a subsequent access to, for example, PCMCIA device 320. For example, arbiter 540 monitors the master number of each master coupled to processor local bus 310 in order to detect which master was last retried during a previous access to a device on PCMCIA bus 315 (e.g., device 320). Arbiter 540 subsequently denies access to processor local bus 310 (e.g., does not grant the bus 310 to the requesting bus master) until such time corresponding to the latency period stored in wait register 530 elapses. Hence, in this embodiment, arbiter 540 is responsible for ensuring processor local bus 310 is efficiently utilized.

Thus, in this manner each of the above embodiments (e.g., systems 300, 400, and 500) exponentially increase the throughput of processor local bus 310. Each of the above embodiments reduce switching activity due to the unnecessary cycles associated with retried data transactions, thereby reducing power consumption. Each of the above embodiments is particularly useful when relatively slow devices, as is often the case with PC card devices, interface directly with a bus master (e.g., the microprocessor for example) through the processor local bus.

Figure 5B:
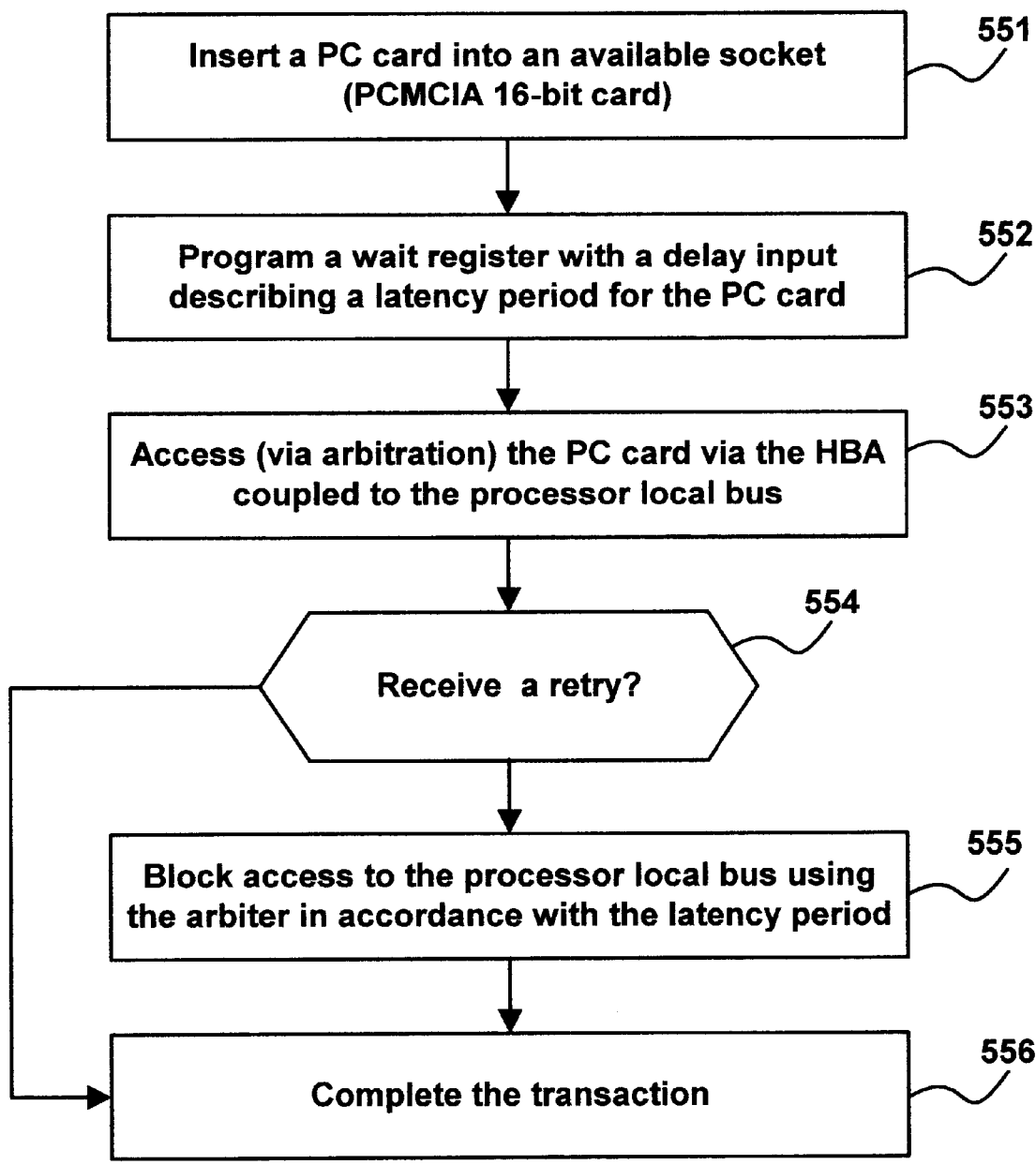
FIG. 5B shows a flow chart of the steps of a process in accordance with a third embodiment of the present invention.

With reference now to FIG. 5B, a flowchart of a process 550 in accordance with one embodiment of the present invention is shown. Process 550 depicts the operating steps of a communication process as implemented on system 500, wherein the delay input stored in wait register 430 is used by and arbiter for controlling access to processor local bus 310, thereby controlling the timing of subsequent accesses and minimizing monopolization.

Process 550 begins in step 551, where the PCMCIA device 320 is inserted into socket 316. In this embodiment, PCMCIA device 320 is a "16-bit" PC card device. Upon insertion, the device driver for PCMCIA device 320 is automatically loaded and device 320 is automatically configured for operation.

In step 552, the device driver automatically programs wait register 530 with a delay input describing the latency period for the particular PC card. As described above, depending upon the type of device implemented by PC card 320 (e.g., telephone modem, flash memory, or the like), the PC card will have a certain amount of data transfer latency. The delay input describes this particular latency.

In step 553, the PC card 320 is accessed by one of bus masters 501–502 via the HBA 504. As described above, HBA 504 functions as a bridge between the devices on the processor local bus 310 and the PCMCIA bus 315.

In step 554, depending upon the specific type of device implemented in PC card 320, the HBA 504 will either issue a retry or not. Where the data is immediately available, such as where the data transaction is a write transaction and where the write data can be "posted" in HBA 504 for later forwarding, a retry is not issued and process 550 proceeds directly to step 556 where the transaction is completed. Where the data transaction is such that it cannot be immediately executed (e.g., a read transaction), process 550 proceeds to step 555.

In step 556, arbiter 540 monitors the master number of each master coupled to processor local bus 310 in order to detect which master was last retried during a previous access to PC card 320 and reads the delay input stored in wait register 530. The arbiter 540 uses this information to determine whether a subsequent transaction (wherein the previous transaction received a retry in step 555) is directed at the same PC card device 320. As described above, arbiter 540 reads the latency period stored in wait register 430 via line 511 and will wait a period of time in accordance with latency period before granting the processor local bus 310 to the requesting bus master.

In step 557, after the expiration of the latency period, the bus master is granted control of the processor local bus 310 and successfully completes the transaction. By waiting at amount of time dictated by the latency period, the arbiter prevents any one bus master from tying up the processor local bus 310 with wait states or wasted access attempts.

Thus, the present invention is a method and system for optimizing a host bus that interfaces directly to a 16 bit PCMCIA host bus adapter. The system of the present invention provides a method and system that minimizes the local bus monopolization problems that occur where a faster device on the processor local bus of embedded microprocessor ASIC continually attempts to access a slower PC card device on a PCMCIA bus. The system of the present invention minimizes local bus monopolization problems without adding additional switching activity or latency to the operation of the local bus. In addition, the system of the present invention significantly increases the available local bus data transfer bandwidth available to the embedded microprocessor.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A data transaction access system for an embedded microprocessor coupled to a PCMCIA bus device, comprising:

a local bus adapted to convey digital signals;

a bus master coupled to the local bus;

a host bus adapter coupled to the local bus for enabling communication between the bus master and a PCMCIA device coupled to the host bus adapter via a PCMCIA bus; and a wait register coupled to host bus adapter, the wait register adapted to receive a delay input describing a latency period of the PCMCIA device, wherein the host bus adapter is configured to insert wait states into a data transaction from the bus master to the PCMCIA device when the delay input is less than a predetermined amount and wherein the host bus adapter is configured to retry the bus master when the delay input is greater than the predetermined amount.

2. The system of claim 1 further comprising:

an address comparator coupled to the host bus adapter, the address comparator adapted to store an address corresponding to the PCMCIA device such that the host bus adapter recognizes an access targeted at the PCMCIA device.

3. The system of claim 1 wherein the bus master is a microprocessor.

4. The system of claim 1 wherein the PCMCIA device is a PC card 16 device.

5. The system of claim 1 wherein the local bus, the bus master, the host bus adapter, and the wait register are implemented as a single integrated circuit device.

6. A data transaction access system for an embedded microprocessor coupled to a PCMCIA bus device, comprising:

a local bus adapted to convey digital signals;

a bus master coupled to the local bus;

a host bus adapter coupled to the local bus for enabling communication between the bus master and a PCMCIA device coupled to the host bus adapter via a PCMCIA bus; and a wait register coupled to host bus adapter, the wait register adapted to receive a delay input describing a latency period of the PCMCIA device, the wait register adapted to couple the delay input to the bus master such that the bus master initiates a subsequent access to the PCMCIA device at the expiration of the latency period in order to efficiently complete the subsequent access to the PCMCIA device.

7. The system of claim 6 further comprising:

an address comparator coupled to the host bus adapter, the address comparator adapted to store an address corresponding to the PCMCIA device such that the bus master and the host bus adapter recognize an access targeted at the PCMCIA device.

8. The system of claim 6 wherein the bus master is a microprocessor.

9. The system of claim 6 wherein the PCMCIA device is a PC card 16 device.

10. The system of claim 6 wherein the local bus, the bus master, the host bus adapter, and the wait register are implemented as a single integrated circuit device.

11. The system of claim 6 further including a plurality of bus masters coupled to the local bus for communicating with the PCMCIA device, wherein the wait register is adapted to couple the delay input to each of the plurality of bus masters.

12. A data transaction access system for an embedded microprocessor coupled to a PCMCIA bus device, comprising:

a local bus adapted to convey digital signals;

a plurality of bus masters coupled to the local bus;

a host bus adapter coupled to the local bus for enabling communication between the bus masters and a PCMCIA device coupled to the host bus adapter via a PCMCIA bus;

a wait register coupled to host bus adapter, the wait register adapted to receive a delay input describing a latency period of the PCMCIA device; and an arbiter coupled to each of the bus masters and the wait register for arbitrating the local bus, wherein the arbiter is configured to grant the local bus to one of the bus masters at the expiration of the latency period described by the delay input such that the one bus master initiates a subsequent access to the PCMCIA device at the expiration of the latency period.

13. The system of claim 12 wherein the arbiter is adapted to monitor the processor local bus and use a number of the bus master to recognize an access targeted at the PCMCIA device.

14. The system of claim 12 wherein the bus master is a microprocessor.

15. The system of claim 12 wherein the PCMCIA device is a PC card 16 device.

16. The system of claim 12 wherein the local bus, the bus master, the host bus adapter, the arbiter, and the wait register are implemented as a single integrated circuit device.

17. A data transaction access method for an embedded microprocessor device coupled to a PCMCIA bus device, the method comprising the steps of:

conveying digital signals on a local bus;

communicating between a bus master and a PCMCIA device coupled to a host bus adapter via a PCMCIA bus, the communicating performed via the local bus coupled to the host bus adapter;

receiving a delay input describing a latency period of the PCMCIA device at a wait register, the wait register coupled to the host bus adapter;

inserting wait states into a data transaction from the bus master to the PCMCIA device when the delay input is less than a predetermined amount, the wait states inserted by the host bus adapter; and retrying the bus master when the delay input is greater than the predetermined amount, the retrying performed by the host bus adapter.

18. The method of claim 17 further comprising:

storing an address corresponding to the PCMCIA device such that the host bus adapter recognizes an access targeted at the PCMCIA device, the storing performed with an address comparator coupled to the host bus adapter.

19. The method of claim 17 wherein the bus master is a microprocessor.

20. The method of claim 17 wherein the PCMCIA device is a PC card 16 device.

* * * * *